United States Patent [19]

Brandl et al.

[11] Patent Number: 4,752,308
[45] Date of Patent: Jun. 21, 1988

[54] PROCESS FOR THE RECONDITIONING OF QUENCH WATER

[75] Inventors: Adrian Brandl; Heinz J. Keller, both of Dortmund; Herbert Wehner, Schwerte, all of Fed. Rep. of Germany

[73] Assignee: Uhde GmbH, Dortmund, Fed. Rep. of Germany

[21] Appl. No.: 917,181

[22] Filed: Oct. 9, 1986

[30] Foreign Application Priority Data

Oct. 22, 1985 [DE] Fed. Rep. of Germany ....... 3537493

[51] Int. Cl.$^4$ ............................................. B01D 47/00
[52] U.S. Cl. ............................................ 55/89; 55/94; 210/774; 210/808
[58] Field of Search ............ 210/808, 774, 767, 512.1; 55/84, 89, 93, 94

[56] References Cited

U.S. PATENT DOCUMENTS

| 4,013,455 | 3/1977 | Kleeberg et al. | 55/84 |
| 4,123,502 | 10/1978 | Holter et al. | 55/84 |
| 4,297,332 | 10/1981 | Tatani et al. | 55/89 |

Primary Examiner—Frank Sever
Attorney, Agent, or Firm—Toren, McGeady & Associates

[57] ABSTRACT

Referring to a process for the reconditioning of quench water or scrubbing water obtained as effluent from plants for the pressure gasification of solid or liquid fuels it is intended to provide for a method which eliminates the need of cooling and expanding large volumes of quench water for the purpose of solids separation. This is achieved by pressurizing the solids-laden quench water withdrawn from the quench chamber and admitting it to a high-pressure solids separator at a temperature substantially equal to the quench chamber temperature.

12 Claims, 1 Drawing Sheet

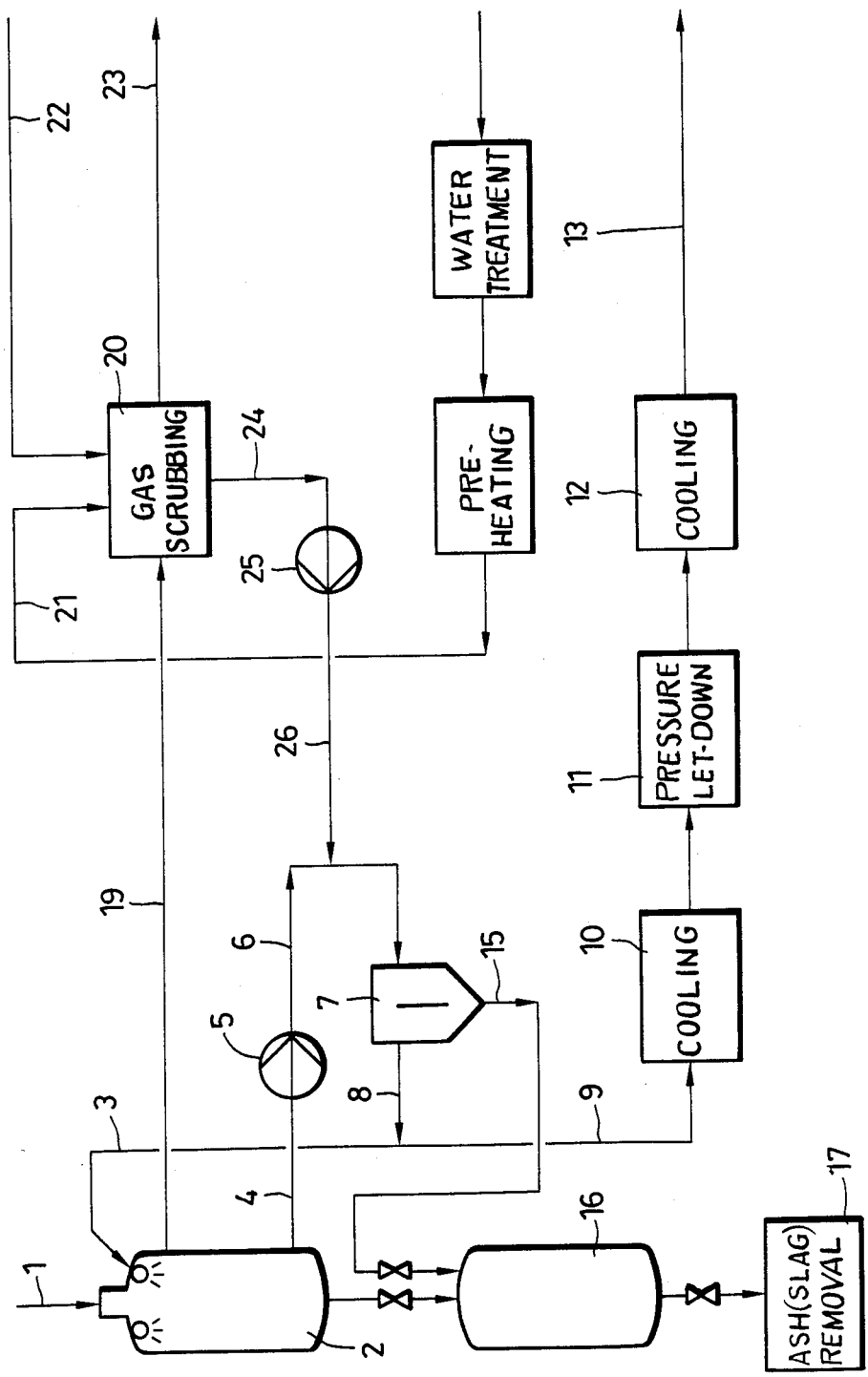

PROCESS FOR THE RECONDITIONING OF QUENCH WATER

The invention relates to a process for the reconditioning of quench water or scrubbing water obtained as effluent from plants for the pressure gasification of solids or liquid fuels.

The raw gas produced by pressure gasification of fuels, such as coal, residues from coal hydrogenation, peat, etc. must be subjected to purification. Water is used as quenching or scrubbing fluid. It is known to withdraw the solids-laden water from the quench chamber for cooling and expansion in several stages and subsequent purification and to return part of the water to the quench chamber after raising the pressure and preheating. As is known from DE-OS No. 27 35 090 and the article by J. Kolaian, W. Schlinger (Energy Progress Vol. 2, No. 4, Dec. 82, pages 228 to 233) as well as from the conference paper by E. Norton, K. Gockenbach "Chemicals from coal", Apr. 14–18, 1985, San Francisco, the water withdrawn from the quench chamber is cooled, expanded and partly recirculated after separation of solids.

Considering that pressure gasification is performed at pressure levels above 5 bar, generally at 10 to 80 bar, and that, depending on the gasification process and the cooling step, a raw gas is produced at temperatures from 200° to 2000° C., the steps of cooling and expanding the solids-laden quench water require.considerable expenditure in terms of equipment and energy because large volumes of solids-laden water must be treated. Considering further that the solids must be entrained through the entire equipment until solids separation, this means reduced plant efficiency and considerable wear of the equipment.

The object of the invention is to provide for a method which eliminates the need of cooling and expanding large volumes of quench water for the purpose of solids separation.

Referring to a process as outlined above, the problem is solved according to the invention in that the solids-laden quench water withdrawn from the quench chamber is pressurized and admitted to a high-pressure solids separator at substantially the same temperature that is prevailing in the quench chamber.

By the method according to the present invention, the solids can be retained at a high pressure immediately after leaving the quench chamber. The pressure is generally raised by the pump that withdraws the solids-laden quench water. Pressurizing has another advantage in that solids separation can be performed more easily.

The quench chamber being at a temperature from 120° to 260° C., the comparatively high temperature adds to facilitating the separation because the water density drops with rising temperature while the solids density remains practically constant.

A preferred embodiment of the invention provides for part of the water leaving the high-pressure solids separator (clear effluent) to be returned to the quench chamber.

The invention also provides for part of the water to be cooled and expanded to ambient conditions in order to remove the dissolved salts. The water treated in said way is substantially free of suspended solids so that the equipment installed for handling this water, such as the expansion valves, etc. is subject to mild service conditions. In addition, the clogging of cooler tubes is avoided, etc. According to a further embodiment of the invention, the solids retained by the high-pressure solids separator are withdrawn intermittently through a lock hopper or continuously through an expansion device.

The invention finally provides for overflow water from the quench chamber to pass into the downstream gas scrubbing unit from where part of the water is admitted after pressurizing to the high-pressure solids separator.

The invention is described below in more detail on the basis of the attached drawing. The latter is a schematic flowsheet of a plant for performing the process according to the invention.

The hot raw gas passes through line 1 into quench chamber 2. Quenching water is injected through line 3 as indicated by symbols in the drawing. The quench water accumulating in the bottom part and loaded with solids is admitted through line 4 to a booster pump 5 which feeds the solids-laden quench water through line 6 to a high-pressure solids separator 7.

The drawing shows the best mode of the invention.

Referring to the example illustrated in the drawing, the clear effluent is withdrawn from high-pressure separator 7 through line 8 from where part of the effluent passes through feed line 3 to quench chamber 2. The balance goes through line 9 to a heat exchanger 10, for example, where the water is cooled before it is expanded in device 11 and further cooled in heat exchanger 12. The water is withdrawn from the system through line 13.

The solids are admitted as a suspension phase, for example, through a line 15 to a discharge lock hopper 16. The ash (slag) can be removed through an ash discharge device 17. The upper part of the plant flowsheet shows a line 19 from quench chamber 2 to gas scrubber 20. This line 19 is provided for admitting the cooled gas from quench chamber 2 to gas scrubber 20. Line 21 serves for adding treated fresh water. In addition, further process condensate can be added to the process through line 22. The scrubbed gas leaves the process through line 23.

Solids-laden wastewater leaves the gas scrubber through line 24 and is sent to pump 25 which raises it to the pressure level prevailing in high-pressure solids separator 7 and conveys the water through line 26 to line 6.

As outlined before, the density of the water drops with rising temperature. Here are some figures:

Depending on the properties of the solids, the solids density may be assumed to be in the range from about 2100 to 2700 kg/m$^3$ while water densities are as follows:

d (40° C.) = 992 kg/m$^3$,
d (120° C.) = 942 kg/m$^3$,
d (260° C.) = 784 kg/m$^3$.

The following description reflects two examples of process conditions including pressures, temperatures and quantities, on a comparative basis referred to conventional practice.

EXAMPLE 1

Referring to an entrained-bed gasification unit operating at a pressure of 65 bar, the quench chamber 2 receives the hot raw gas through line 1 and 179 t/h of quench water through line 3. The raw gas is being cooled and saturated with water vapour.

80 t/h of the non-vaporized water containing approximately 336 kg of solids are withdrawn from quench chamber 2 through line 4 by pump 5 and sent to a hydrocyclone 7. The temperature of the water in line 4 is approximately 248° C. Pump 5 raises the pressure by 5 to 8 bar to compensate the pressure drop across the high-pressure separator, the valves and the piping.

Upstream of hydrocyclone 7, water from line 26 is admixed to the quench water flow in line 6 at a rate of 138.2 t/h, a temperature of about 240° C. and a comparable pressure level. This make-up water contains about 200 kg of solids from the gas scrubber 20.

In the hydrocyclone, 492.6 kg/h of solids are retained in the form of a 30% suspension, withdrawn through line 15 and admitted to the slag lock hopper which operates intermittently.

The clear effluent (line 8) is split into 179 t/h of quench water in line 3 and 38 t/h of wastewater in line 9. This clear effluent contains maximum 200 ppm of solids.

In comparing the above example with the conventional process it is found that 78.8 t/h of wastewater from line 9 containing 536 kg suspended solids would have had to be subjected to a cooling step 10, an expansion step 11, a further cooling step and a reconditioning step with preheating.

EXAMPLE 2

Referring to an entrained-bed coal gasification unit operating at 32 bar, the quench chamber receives the hot raw gas and 179 t/h of quench water. The raw gas is being cooled and saturated with water vapour.

125.7 t/h of the non-vaporized water containing about 201 kg of solids are withdrawn from quench chamber 2 by pump 5 and admitted to a coalescing plate-type separator 7. The water is at a temperature of approximately 210° C. Pump 5 raises the pressure in line 6 by 5 to 8 bar.

Upstream of coalescing plate-type separator 7, water containing 110 kg of solids is admixed through line 26 to the flow in line 6 at a rate of 77 t/h, a temperature of about 201° C. and a comparable pressure level.

In the coalescing plate-type separator, 270.6 kg of solids are retained in the form of a 30% suspension and subsequently sent to slag lock hopper 17.

The clear effluent is split into 23 t/h of wastewater and 179 kg/h of quench water. It contains approximately 200 ppm of solids.

Referring to a process according to the state of the art, wastewater at a rate of 124.8 t/h containing 311 kg suspended solids instead of said 23 t/h would have had to be withdrawn, cooled, expanded, treated and recycled as turbid water at a rate of 98.9 t/h.

We claim:

1. Process of reconditioning solids-laden quench water obtained as effluent from plants for the pressure gasification at pressure levels above 5 bar of solid or liquid fuels, wherein the process comprises providing an alternative for cooling and expanding large volumes of quench water for solids separation by the steps of separately introducing hot raw gases and quench water into a quench chamber while maintaining the quench chamber at a temperature in the range 120° to 260° C., withdrawing solids-laden quench water from the quench chamber, pressurizing the solids-laden quench water withdrawn from the quench chamber, directing the pressurized solids-laden quench water into a high-pressure solids separator operating at substantially the same temperature as the quench chamber.

2. Process according to claim 1 including the steps of cooling the gas within the quench chamber, withdrawing cooled gas from the quench chamber and flowing the cooled gases to a gas purification facility, admitting treated water to the gas purification facility and mixing the water with the cooled gas, withdrawing solids-laden water and pressurizing the solids-laden water from the gas purification facility to the pressure present in the high-pressure solids separator, and mixing the pressurized solids-laden water from the gas purification facility with the pressurized solid-laden water from the quench chamber at a location upstream from the high-pressure solids separator and flowing the mixture of solids-laden water into the high-pressure solids separator.

3. Process according to claim 2 including the steps of removing clear water from the high-pressure solids separator and returning part of the clear water to the quench chamber.

4. Process according to claim 1, 2 or 3 including the steps of retaining solids separated from the solids-laden water in the high-pressure separator and intermittently withdrawing the solids from the high-pressure separator through a lock hopper.

5. Process according to claim 1, 2 or 3 including the steps of retaining solids separated within the high-pressure separator and continuously withdrawing the solids and flowing the solids through an expansion device.

6. Plant for reconditioning solids-laden quench water obtained as effluent from apparatus for the pressure gasification at pressure levels above 5 bar of solid or liquid fuels, comprising means for providing an alternative for cooling and expanding large volumes of quench water for solids separation, including a quench chamber (2) for the separate introduction thereto of hot raw gases and quench water, a suction line(4) connected to said quench chamber and including a booster pump (5) with said suction line arranged to remove solids laden quench water from said quench chamber, said booster pump pressurizes the solids-laden quench water received from said suction line, a discharge line (6) connected to said booster pump for receiving pressurized solids-laden quench water, and a high-pressure solids separator (7) connected to said discharge line (6) for receiving the pressurized solids-laden quench water.

7. Plant, as set forth in claim 6, a recycle line (3) connected to said high-pressure solids separator (7) for withdrawing clear effleunt water from said high-pressure solids separator and for returning the clear effluent water to said quench chamber.

8. Plant, as set forth in claim 6, wherein said high-pressure solids separator (7) is a hydrocyclone.

9. Plant, as set forth in claim 6, wherein said high-pressures solids separator (7) is a gravity settler with internals.

10. Plant, as set forth in claim 6, wherein said high-pressure solids separator (7) is a coalescing plate-type separator.

11. Plant, as set forth in claim 6, wherein said high-pressure solids separator (7) is connected via a discharge line (15) to a lock hopper (17) for the intermittent discharge of solids from said separator to said hopper.

12. Plant, as set forth in claim 6, wherein an overflow line (19) is connected to said quench chamber (2) for withdrawing quench water from the quench chamber, said overflow line (19) is connected to a gas scrubber (20), and a return line (24) containing a booster (25) connected to said gas scrubber and to the line (6) discharging the quench water from the quench chamber to the high-pressure solids separator (7).

* * * * *